United States Patent
Pettinaroli et al.

(10) Patent No.: US 9,964,964 B2
(45) Date of Patent: May 8, 2018

(54) AUTOMATIC BALANCING VALVE WITH PRESET FLOW RATE

(71) Applicant: FRATELLI PETTINAROLI S.p.A., San Maurizio d'Opaglio (IT)

(72) Inventors: Giulio Pettinaroli, San Maurizio d'Opaglio (IT); Liborio Spagnolo, San Maurizio d'Opaglio (IT)

(73) Assignee: FRATELLI PETTINAROLI S.P.A., San Maurizio d'Opaglio (NO) (IT)

( * ) Notice: Subject to any disclaimer, the term of this patent is extended or adjusted under 35 U.S.C. 154(b) by 111 days.

(21) Appl. No.: 15/064,950

(22) Filed: Mar. 9, 2016

(65) Prior Publication Data

US 2016/0266586 A1   Sep. 15, 2016

(30) Foreign Application Priority Data

Mar. 10, 2015  (IT) .............................. MI2015A0363

(51) Int. Cl.
| | |
|---|---|
| *G05D 16/16* | (2006.01) |
| *F16K 31/53* | (2006.01) |
| *F16K 1/32* | (2006.01) |
| *F16K 27/00* | (2006.01) |
| *G05D 7/01* | (2006.01) |

(52) U.S. Cl.
CPC ............... *G05D 16/16* (2013.01); *F16K 1/32* (2013.01); *F16K 27/00* (2013.01); *F16K 31/53* (2013.01); *G05D 7/0106* (2013.01)

(58) Field of Classification Search
CPC ......... G05D 16/18; F16K 31/53; F16K 31/54; F16K 31/60; F16K 1/256; F16K 5/10; Y10T 137/7792; Y10T 137/87917; Y10T 137/7782; Y10T 137/87121

USPC ...................... 251/250, 250.5, 248, 264, 229
See application file for complete search history.

(56) References Cited

U.S. PATENT DOCUMENTS

| | | | | |
|---|---|---|---|---|
| 644,271 | A * | 2/1900 | Bean ..................... | F16K 11/202 137/495 |
| 1,924,886 | A * | 8/1933 | Semon .................. | F16K 43/003 137/315.38 |
| 1,944,979 | A * | 1/1934 | Hastings ................. | F16K 31/53 137/625.49 |

(Continued)

FOREIGN PATENT DOCUMENTS

| | | |
|---|---|---|
| DE | 40 37 413 | 3/1992 |
| WO | WO 2009/135490 | 11/2009 |
| WO | WO 2011/045639 | 4/2011 |

OTHER PUBLICATIONS

Search Report for IT MI2015A000363 dated Jan. 19, 2016, 2 pages.

(Continued)

*Primary Examiner* — Mary McManmon
*Assistant Examiner* — Nicole Gardner
(74) *Attorney, Agent, or Firm* — Nixon & Vanderhye P.C.

(57) ABSTRACT

An automatic balancing valve is described, wherein a flow controller device is provided and comprises at least translationally movable plug and a respective valve seat that cooperates with the plug in order to automatically adjust the fluid flow rate through the valve. A ring nut, combined with the flow controller device, is rotationally hand-operated to move a choking member placed inside the valve. The movement transmission from the ring nut to the choking member is achieved by a mechanism comprising a plurality of toothed gears.

14 Claims, 6 Drawing Sheets

(56) References Cited

U.S. PATENT DOCUMENTS

| | | | | | |
|---|---|---|---|---|---|
| 2,625,362 | A | * | 1/1953 | Evans | F16K 3/16 |
| | | | | | 251/187 |
| 2,693,825 | A | * | 11/1954 | Carr | F16K 31/54 |
| | | | | | 137/599.16 |
| 3,411,541 | A | * | 11/1968 | Hindman | F16K 11/202 |
| | | | | | 137/360 |
| 5,358,212 | A | * | 10/1994 | Soltys | B08B 9/0321 |
| | | | | | 251/121 |
| 7,735,514 | B2 | * | 6/2010 | Marstorp | F16K 1/526 |
| | | | | | 137/501 |
| 8,152,134 | B2 | * | 4/2012 | Stenberg | F16K 1/465 |
| | | | | | 137/557 |
| 8,171,958 | B2 | * | 5/2012 | Morreale | F16K 3/24 |
| | | | | | 137/614.16 |
| 8,469,052 | B2 | * | 6/2013 | Jorgensen | G05D 7/0106 |
| | | | | | 137/495 |
| 2010/0163770 | A1 | * | 7/2010 | Markvart | F16K 5/0605 |
| | | | | | 251/209 |

OTHER PUBLICATIONS

Written Opinion for IT MI2015A000363 dated Jan. 19, 2016, 6 pages (English portions attached).
Extended European Search Report issued in App. No. 16159337.1 dated Oct. 11, 2016.

* cited by examiner

AUTOMATIC BALANCING VALVE WITH PRESET FLOW RATE

This application claims priority to IT Patent Application No. MI2015A000363 filed 10 Mar. 2015, the entire content of which is hereby incorporated by reference.

FIELD OF THE INVENTION

The present invention relates in general to an automatic balancing valve and, in particular, to a flow-controller valve with automatic pressure balance.

In plumbing fixtures constituted by several sections, in each section the fluid flow rates are set in the designing step but they can also vary during operations.

For example, referring in particular to heating and/or cooling systems in environments such as schools, hospitals, hotels, shopping centers or the like, the variation in different flow rates with respect to the design data would inevitably cause temperature differences in the various environments that involve an increase of power consumptions, in addition to make unease situations.

PRIOR ART

Automatic balancing valves are already known in the art, usually comprising a valve body in which a differential-pressure regulator device and a flow controller device are housed, both crossed by a fluid entering from an inlet channel and exiting through an outlet channel.

These kinds of valves have essentially the task of adjusting the flow rate of the heat-transfer fluid towards the terminal units of the heating and cooling systems, for example radiators, fan convectors or the like, independently from pressure variations that can occur in these systems. The automatic adjustment of the flow rate is achieved by one or more moving parts that open/obstruct the ports for the fluid passage in the valve as the fluid pressures change upstream and downstream of the valve.

The International Patent Application n. WO2001/045639, in the name of the same Applicant, describes an automatic balancing valve in which a choking wall can be rotationally hand-operated by a ring nut.

The ring nut and the choking wall are made in one piece with the same material, for example a plastic material such as PSU (polysulfone) or the like, which is able to withstand high positive and negative temperature ranges without suffering significant structural and size changes.

However, it is convenient to consider that the choking wall is in contact with the heat exchange fluid, whereas the ring nut is exposed to ambient temperature. Therefore temperature gradients arise that can cause damages during time, such as rifts or cracks in the plastic material constituting the ring nut/choking wall assembly.

Moreover, the assembly constituted by the ring nut and the choking wall has complex geometry and is made with requirements of very restricted production tolerances, so that it can be assembled properly on the valve body made of brass. This can make critical the moulding step of the plastic material and can involve difficulties in the valve assembling step.

SUMMARY OF THE INVENTION

That being stated, an object of the present invention is to propose an automatic balancing valve in which the choking member can be made separately from the ring nut that presets the flow rate, while still keeping the same adjustment precision and functionality.

Another object of the present invention is to propose a valve of the above described type, which allows the ring nut placed outside of the valve body and the choking member placed inside the valve body to be made of different materials.

These objects are achieved by the invention through an automatic balancing valve according to claim 1. Further characteristics and advantages of the present invention are set forth in the respective dependent claims.

An automatic balancing valve generally comprises a valve body having at least one inlet channel and at least one outlet channel. In the valve body a differential-pressure regulator device and a flow controller device are housed, wherein the latter includes at least one translationally movable plug and a respective valve seat that cooperates with the plug in order to automatically adjust the fluid flow rate through the valve. A ring nut is combined with the flow controller device and arranged outside of the valve body, the ring nut being rotationally hand-operated to move a choking member placed inside the valve between an open position, in which the fluid exiting from the port defined between the plug and the valve seat is free to flow, and one or more choking positions in which the section for the passage of fluid exiting from the port comprised between the plug and the valve seat is reduced.

The balancing valve according to the present invention comprises a plurality of toothed gears transmitting the movement from the ring nut to the choking member. Advantageously, this allows separating the ring nut from the choking member, thereby allowing realizing each element with the more suitable material. For example, the ring nut can be made with a plastic material, such as for example PSU or the like, whereas the choking member in contact with the heat-transfer fluid can be made of metal, for example brass or the like.

The ring nut preferably has annular shape with a toothed inner surface coupled with a first portion of the outer toothing of a pinion, whereas a second portion of the outer toothing of the pinion is coupled with a ring gear provided with an outer toothed surface and, in its turn, connected to the choking member in order to rotate the latter. The ring nut has therefore a particularly simple geometry with respect to known solutions and can be easily made and assembled. The pinion and the rest of the toothed gears have simple geometries and can be made of the most suitable materials, for example metal materials for the gears placed inside the valve body, whereas the pinion can be indifferently made of another material.

For example, the ring gear is made of plastic material and advantageously has a U-shaped chord section aiding the assembling thereof in a circular groove by elastic deformation.

Preferably, the ring gear has an inner surface provided with vertically protruding ribs engaged in corresponding grooves obtained on the outer surface of the choking member so that the reciprocal axial movement between the ring gear and the choking member is allowed.

In its turn, the choking member has an inner hub with an axial threaded hole, the latter being engaged with a corresponding outer threaded portion of the headwork of the flow controller device so as to impart a translation movement to the choking member once the ring nut has been rotated.

In practice, such a mechanism allows imparting a roto-translation movement to the choking member and allows making an easy-to-mount choking member with a particularly simple geometry.

The choking member has a cylindrical shell with diameter greater than the maximum diameter of the plug in order to allow their reciprocal movement one independently from another. In other words, the cylindrical shell of the choking member surrounds the plug and flows axially inside it, thereby carrying out the choking function depending on its axial position with respect to the valve seat cooperating with the plug.

The ring nut is provided with a scale of percent values indicative of the percent of flow rate that can be preset. The set value is denoted by reference values depending of the ring nut position.

A locking element to lock the ring nut rotation is provided, which can be taken away from the locking position in order to allow the ring nut rotation and then repositioned once the desired flow rate percentage has been set.

For example, a reference mark can constitute a portion of the locking element but also a reference mark depicted on an element stationary with respect to the ring nut rotation, can be provided. This allows facilitating the correct set-up of the desired percent value during the ring nut rotation as, once the locking element has been removed to allow the ring nut rotation, the mark combined therewith is not available.

BRIEF DESCRIPTION OF THE DRAWINGS

Further features and advantages of the present invention will be more apparent from the following description which is given by way of illustration and not by way of limitation with reference to the accompanying drawings, in which.

DETAILED DESCRIPTION

Figure 1:
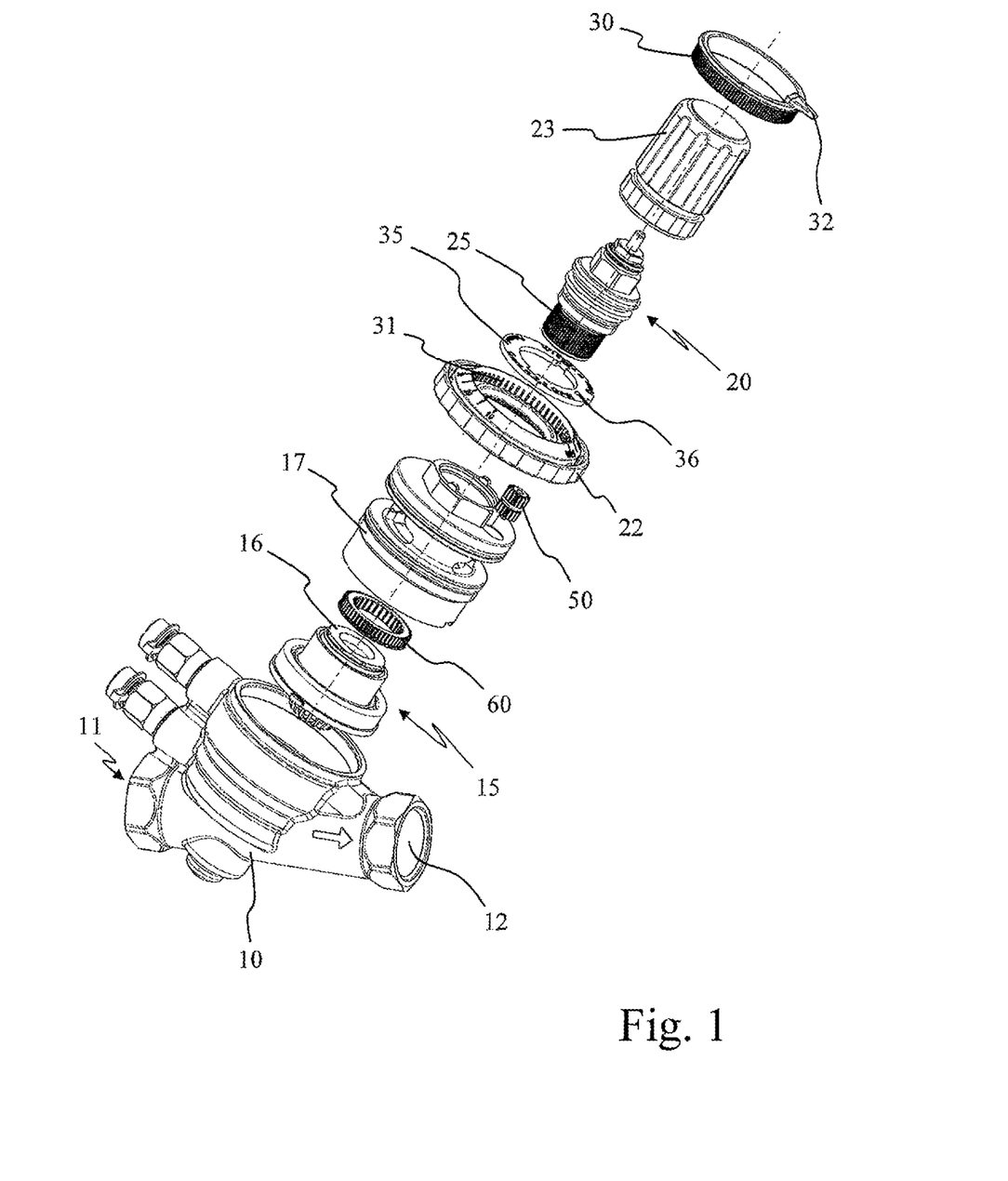
FIG. 1 is a perspective exploded view of an automatic balancing valve according to an embodiment of the present invention.
Figure 2:
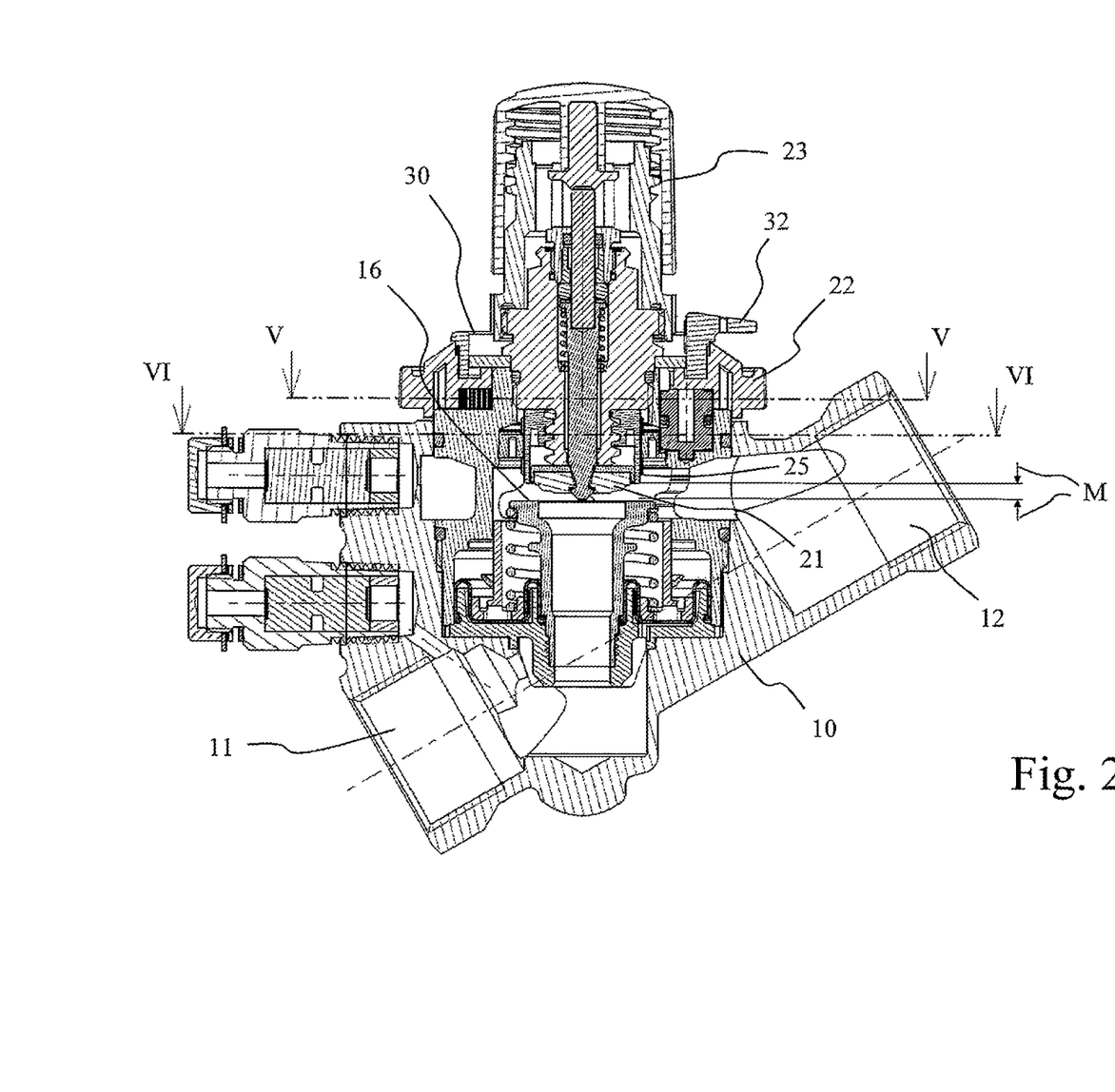
FIG. 2 is a longitudinal sectional view of the valve of FIG. 1 in assembled condition.

The automatic balancing valve depicted in FIGS. 1 and 2 comprises a valve body 10 having an inlet channel 11 and an outlet channel 12. A differential-pressure regulator device 15, locked by an insert 17, and a flow controller device 20 to control the flow or, in other words, the flow rate, are housed in the valve body 10.

The flow controller device 20 includes a translationally movable plug 21 cooperating with a respective valve seat 16 of the regulator device 15 to automatically modulate the fluid flow rate through the balancing valve. A ring nut 22, placed outside of the valve body 10, is combined with the flow controller device 20, the ring nut being rotationally hand-operated to move a choking member 25 placed inside the balancing valve between a position of maximum opening and one or more choking positions.

Figure 3A:
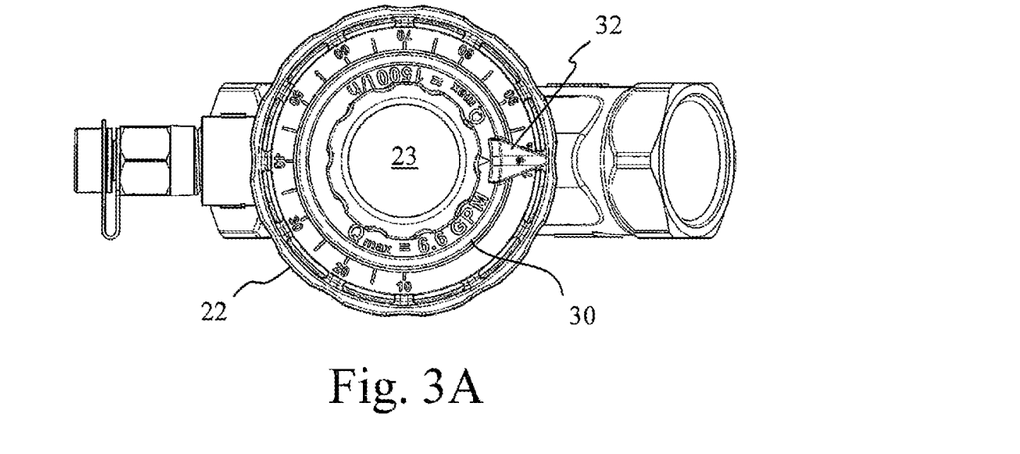
FIGS. 3A and 3B are respectively a top plan view and a longitudinal sectional perspective view that depict a first preset condition of a valve according to the present invention.
Figure 3B:
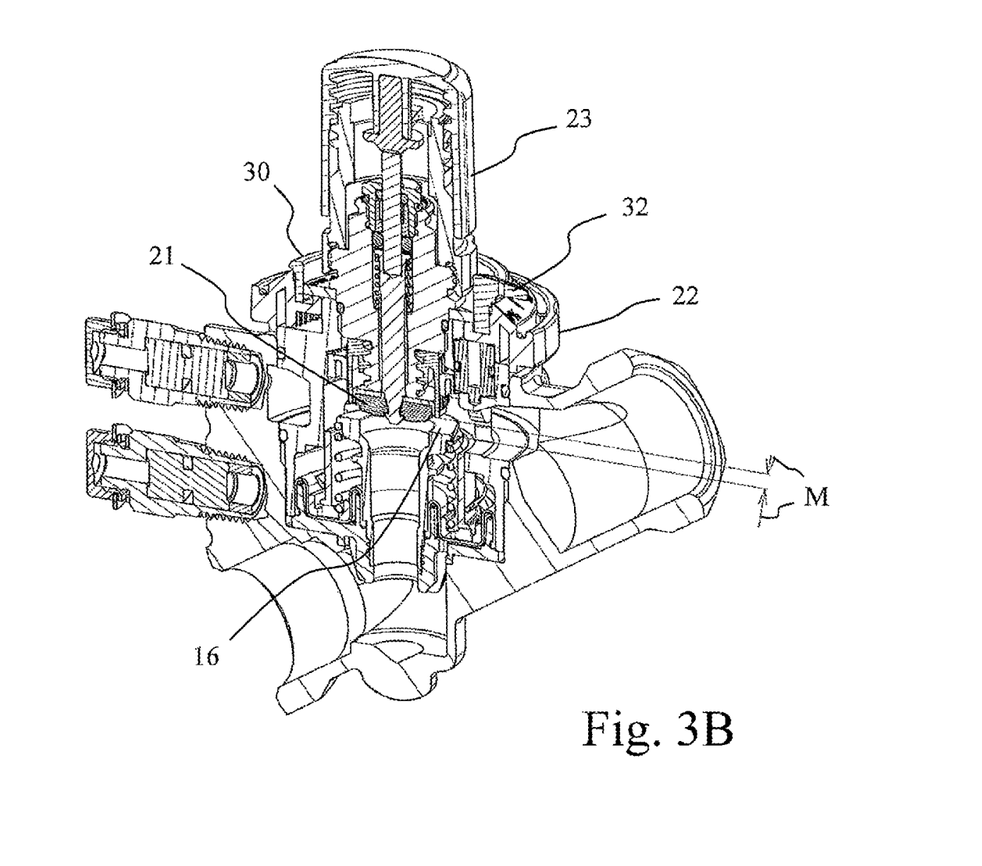

In the top part of FIG. 1, a removable locking element 30 is also highlighted that prevents the ring nut 22 from rotating when the first is housed in the respective seat 31 of the ring nut, and on the contrary allows the rotation of the ring nut 22 when it is removed. The locking element 30 comprises a reference mark 32 constituting a portion thereof and being made integrally therewith. The reference mark 32, once inserted in the seat 31 in the locking position, is directed to the percent value preset for the flow rate among those depicted in a scale of percent values on the ring nut 22. In the position of maximum opening, the ring nut 22 being therefore preset to the 100% value (FIG. 3A), the choking member 25 is completely raised and at a height M with respect to the seat valve 16 (FIGS. 2 and 3B). In the view of FIG. 3A, the locking element 30 is inserted in its seat 31 and then the rotation of the ring nut 22 is prevented.

The fluid exiting from the port defined between the plug 21 and the seat valve 16 is free to flow from the choking member 25, and the flow rate adjustment is assigned only to the plug 21. The latter translates closer or away with respect to the valve seat 16 through modes known in the art, for example by manually acting on a knob 23 or else by installing a driven activating device, such as for example a wax bulb or an electric motor, in substitution of the knob 23.

Figure 4A:
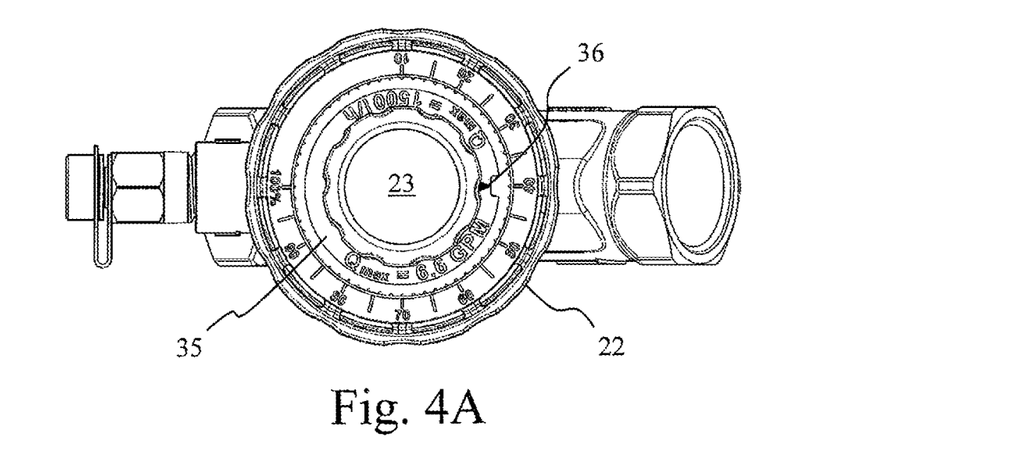
FIGS. 4A and 4B are respectively a top plan view and a longitudinal sectional perspective view that depict a second preset condition of a valve according to the present invention.
Figure 4B:
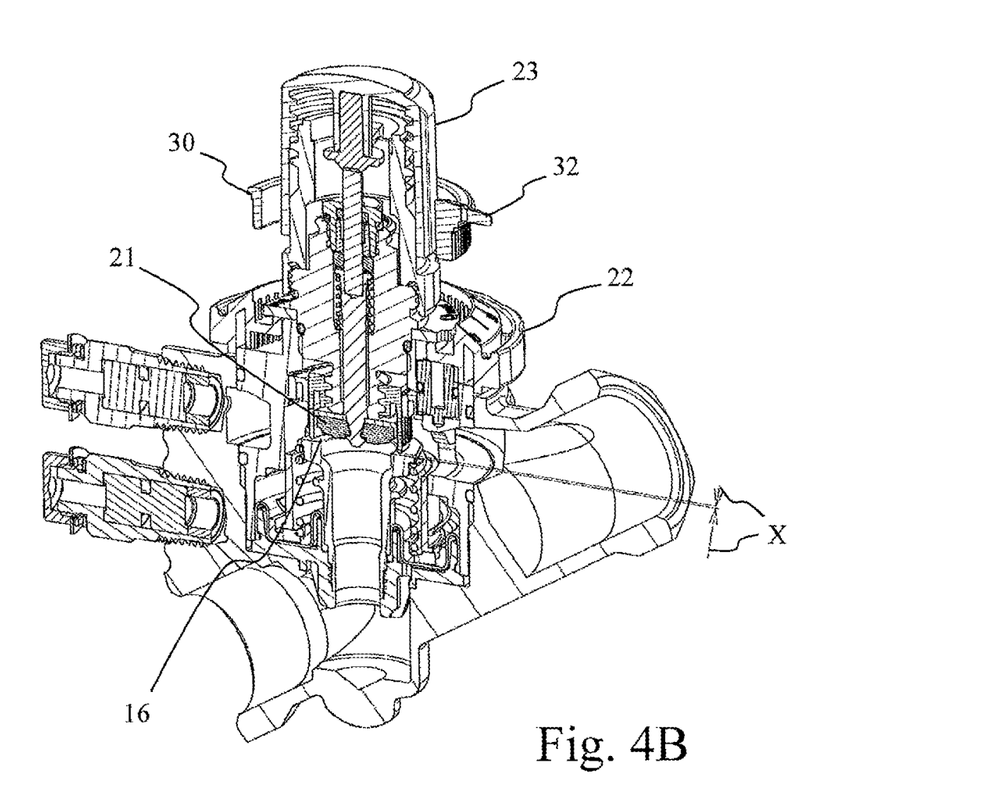

On the contrary, an example illustrating the choking member 21 in a possible position limiting the flow rate is depicted with reference to FIGS. 4A and 4B. In FIG. 4A, the ring nut 22 is depicted as rotated to the 40% value after the locking element 30 has been removed from the seat 31, to allow the rotation of the ring nut 22. In this condition, i.e. in absence of the reference mark 32, the preset percent value is anyway denoted by a reference mark 36 depicted on a fixed element, for example a ring 35, with respect to the rotation of the ring nut 22.

In the choking position selected in FIG. 4A, the choking member 25 is lowered to a height X with respect to the valve seat 16 (FIG. 4B). The port defined between the choking member 25 and the valve seat 16 is therefore reduced, independently from the position of the plug 21. As a matter of fact, the choking member 25 has a cylindrical shell with diameter greater than the maximum diameter of the plug 21 in order to allow their reciprocal movement one independently from another. The plug 21 can therefore intervene to further limit the flow rate, i.e. by translating downwards until moving closer to the valve seat 16 more than the lower edge of the cylindrical shell of the choking member 25 is close thereto.

Figure 5:
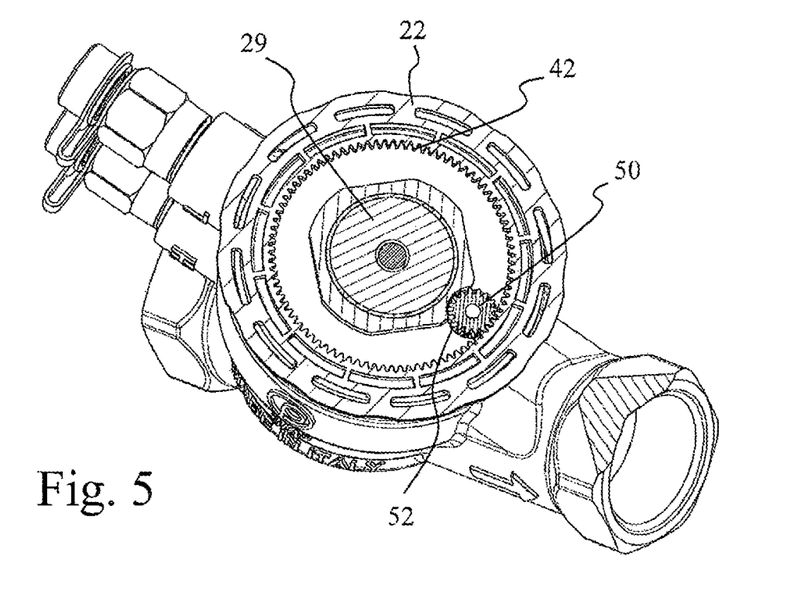
FIG. 5 is a cross sectional view of the valve according to the plane V-V of FIG. 2.
Figure 6:
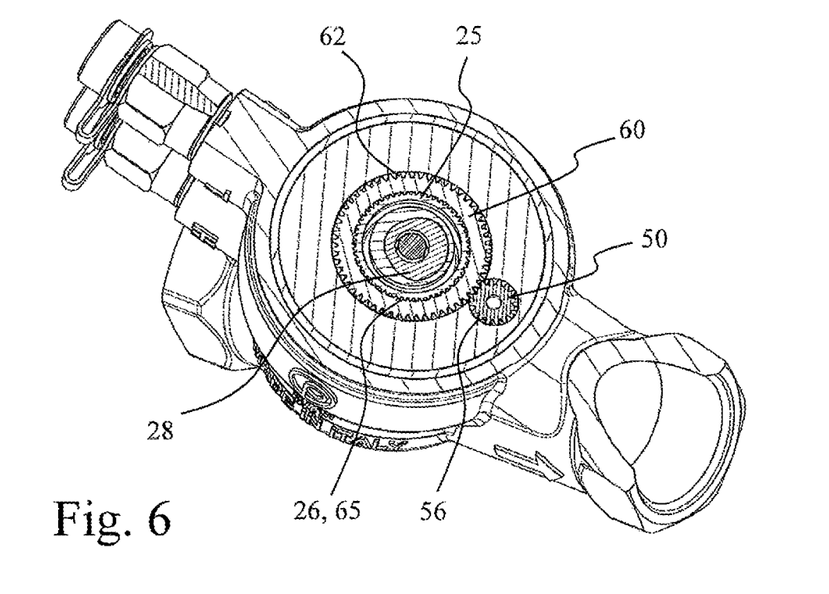
FIG. 6 is a cross sectional view of the valve according to the plane VI-VI of FIG. 2.
Figure 7:
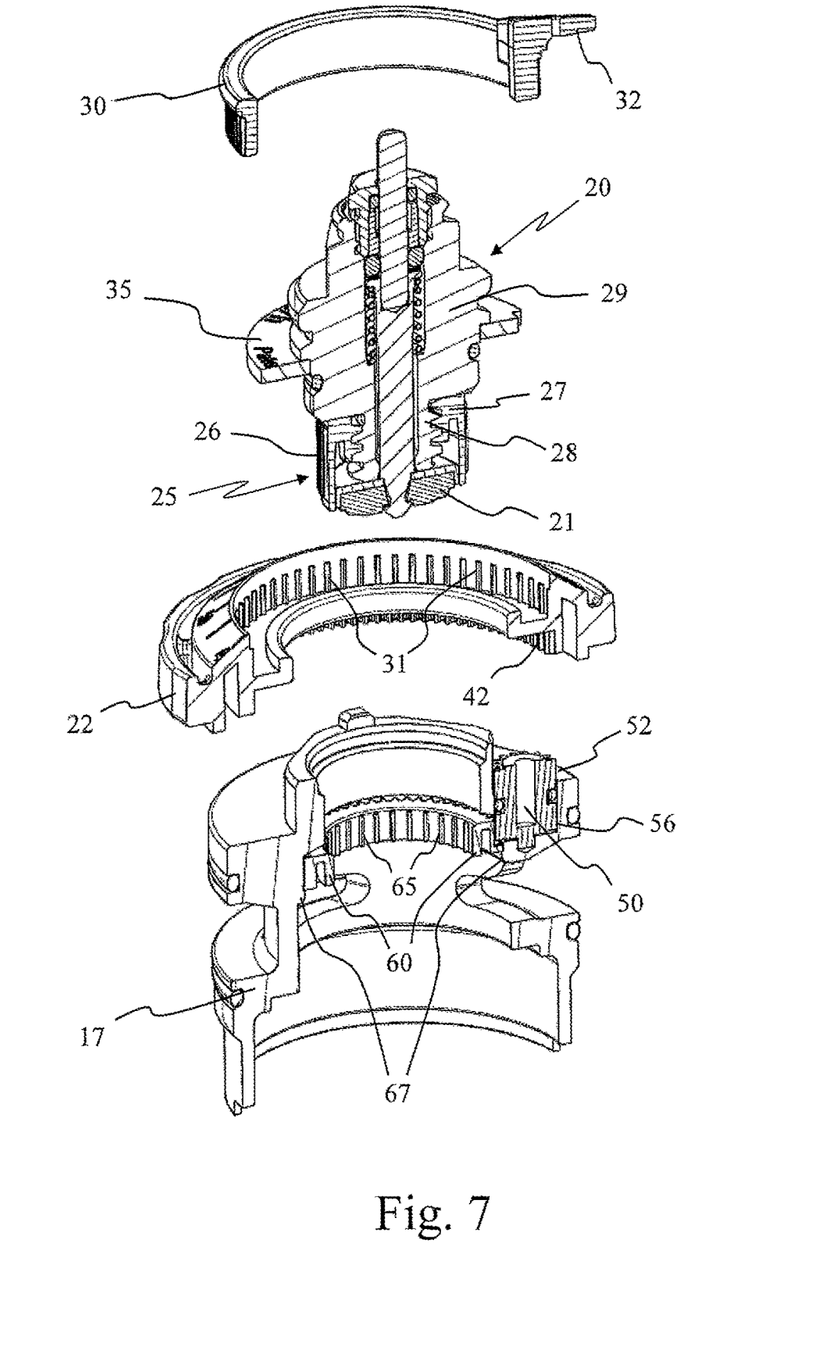
FIG. 7 is an exploded view of some components of the valve depicted in FIG. 2.

In FIGS. 5 to 7 the mechanism transmitting the motion between the ring nut 22 and the choking member 25 is depicted.

As visible in FIG. 5, the ring nut 22 has annular shape and is provided with a toothed inner surface 42 coupled with a first portion 52 of the outer toothing of a pinion 50. In FIG. 6, the coupling between a second portion 56 of the outer toothing of the pinion 50 coupled with a ring gear 60 provided with an outer toothed surface 62, is highlighted.

The ring gear 60 is connected to the choking member 25 to allow to rotationally drive it. In fact, the ring gear 60 has an inner surface provided with vertically protruding ribs 65, which are visible in detail in FIG. 7, engaged in corresponding grooves 26 obtained on the outer surface of the choking member 25. This allows the choking member 25 to be rotationally driven by the ring gear 60 and the simultaneous and reciprocal axial sliding between them.

In fact, the choking member 25 has an inner hub 27 with an axial threaded hole, the latter being engaged with a corresponding outer threaded portion 28 of the headwork 29 belonging to the flow controller device 20. The coupling between the inner hub 27 and the threaded portion 28 imparts a translation movement to the choking member 25 during the rotation thereof. In practice, the rotation movement of the ring nut 22 is transformed to a roto-translation movement of the choking member 25.

As visible in FIG. 7, the ring gear 60 has a U-shaped chord section to allow a little elastic deformation easing the assembling of the ring gear 60 in a circular seat of the insert 17. As a matter of fact, the ring gear 60 is inserted through the lower opening of the insert 17 and forced into the respective groove until going past a projecting edge 67 that holds it as locked in position in the respective seat.

Various modifications may be made to the embodiments described herein without departing from the scope of the present invention. For example, the materials of the various components can also be different from those hitherto described, as long as suitable for the purpose. Moreover, the separated toothed portions 52 and 56 of the pinion 50 can have a tooting with equal or different pitch depending on the gear ratio to be obtained through the gears transmitting the motion from the ring nut 22 to the choking member 25.

The invention claimed is:

1. An automatic balancing valve comprising a valve body having at least one inlet channel and at least one outlet channel in which, in the same valve body, a flow controller device and a differential-pressure regulator device are housed, and wherein said flow controller device includes at least one port defined between a translationally movable plug and a respective valve seat that cooperates with said plug in order to adjust the fluid flow rate through the valve, a ring nut being combined with said flow controller device and arranged outside of said valve body, the ring nut being rotationally hand-operated to move a choking member placed inside the valve between an open position, in which the fluid exiting from the port defined between said plug and said valve seat is free to flow, and one or more choking positions in which a passage of fluid exiting from the port comprised between said plug and said valve seat is reduced, wherein a plurality of toothed gears are provided for transmitting the movement from said ring nut to said choking member, characterized in that a ring gear is provided having an outer toothed surface and an inner surface with vertically protruding ribs engaged in corresponding grooves obtained on the outer surface of said choking member, so that the reciprocal axial movement between said ring gear and said choking member is allowed, wherein a pinion is provided having a first outer toothing portion and a second outer toothing portion, and wherein said ring nut has an annular shape with a toothed inner surface coupled with the first portion of the outer toothing of said pinion, and wherein the second portion of the outer toothing of said pinion is coupled with said ring gear having the outer toothed surface and, in its turn, connected to said choking member in order to rotate the latter.

2. The valve according to claim 1, wherein said ring gear having the outer toothed surface has a U-shaped chord section.

3. The valve according to claim 1, wherein said choking member has a cylindrical shell with a diameter greater than the maximum diameter of said plug in order to allow their reciprocal movement one independently from another.

4. The valve according to claim 1, wherein at least one locking element is provided to lock the rotation of said ring nut, and wherein the locking element is removable from the locking position so that the ring nut can rotate.

5. The valve according to claim 4, wherein a percentage scale is provided on said ring nut and wherein reference marks are provided so that the percentage selected depending on the position of said ring nut is indicated.

6. The valve according to claim 5, wherein at least one of said reference marks constitutes a portion of said locking element.

7. The valve according to claim 5, wherein at least one of said reference marks is provided on an element remaining immovable while said ring nut is rotating.

8. An automatic balancing valve comprising a valve body having at least one inlet channel and at least one outlet channel in which, in the same valve body, a flow controller device and a differential-pressure regulator device are housed, and wherein said flow controller device includes at least one port defined between a translationally movable plug and a respective valve seat that cooperates with said plug in order to adjust the fluid flow rate through the valve, a ring nut being combined with said flow controller device and arranged outside of said valve body, the ring nut being rotationally hand-operated to move a choking member placed inside the valve between an open position, in which the fluid exiting from the port defined between said plug and said valve seat is free to flow, and one or more choking positions in which a passage of fluid exiting from the port comprised between said plug and said valve seat is reduced, wherein a plurality of toothed gears are provided for transmitting the movement from said ring nut to said choking member, characterized in that a ring gear is provided having an outer toothed surface and an inner surface with vertically protruding ribs engaged in corresponding grooves obtained on the outer surface of said choking member, so that the reciprocal axial movement between said ring gear and said choking member is allowed, wherein said flow controller device has a headwork, and wherein said choking member has an inner hub with an axial threaded hole, and wherein said axial threaded hole is engaged with a corresponding outer threaded portion of the headwork of said flow controller device so as to impart a translation movement to said choking member once said ring nut has been rotated.

9. The valve according to claim 8, wherein said ring gear having the outer toothed surface has a U-shaped chord section.

10. The valve according to claim 8, wherein said choking member has a cylindrical shell with a diameter greater than the maximum diameter of said plug in order to allow their reciprocal movement one independently from another.

11. The valve according to claim 8, wherein at least one locking element is provided to lock the rotation of said ring nut, and wherein the locking element is removable from the locking position so that the ring nut can rotate.

12. The valve according to claim 11, wherein a percentage scale is provided on said ring nut and wherein reference marks are provided so that the percentage selected depending on the position of said ring nut is indicated.

13. The valve according to claim 12, wherein at least one of said reference marks constitutes a portion of said locking element.

14. The valve according to claim 12, wherein at least one of said reference marks is provided on an element remaining immovable while said ring nut is rotating.

* * * * *